United States Patent [19]

McCullough et al.

[11] 4,262,657

[45] Apr. 21, 1981

[54] SOLAR AIR HEATER

[75] Inventors: Robert W. McCullough, Tarrytown; Thomas A. Hewett, Chappaqua, both of N.Y.

[73] Assignee: Union Carbide Corporation, New York, N.Y.

[21] Appl. No.: 824,100

[22] Filed: Aug. 12, 1977

Related U.S. Application Data

[63] Continuation-in-part of Ser. No. 712,139, Aug. 6, 1976, abandoned.

[51] Int. Cl.$^3$ ............................................. F24J 3/02
[52] U.S. Cl. .................................. 126/436; 126/441; 126/449
[58] Field of Search ............... 126/270, 271, 400, 432, 126/441, 449, 446; 237/1 A; 165/170, 179

[56] References Cited

U.S. PATENT DOCUMENTS

| | | | |
|---|---|---|---|
| 2,680,437 | 12/1945 | Miller | 126/270 |
| 2,680,565 | 6/1954 | Lof | 126/270 |
| 2,998,005 | 8/1961 | Johnston | 126/270 |
| 3,102,532 | 9/1963 | Shoemaker | 126/270 |
| 3,875,925 | 4/1975 | Johnston | 126/270 |
| 3,981,294 | 9/1976 | Deminet et al. | 126/271 |
| 3,985,116 | 10/1976 | Kapany | 126/271 |
| 3,987,786 | 10/1976 | Keyes et al. | 237/1 A |
| 4,015,582 | 4/1977 | Liu et al. | 126/270 |
| 4,015,583 | 4/1977 | Laing | 126/270 |
| 4,018,211 | 4/1977 | Barr | 126/270 |
| 4,019,496 | 4/1977 | Cummings | 126/271 |
| 4,030,477 | 6/1977 | Smith | 126/271 |
| 4,034,736 | 7/1977 | Telkes | 126/270 |
| 4,038,969 | 8/1977 | Smith | 126/270 |
| 4,054,124 | 10/1977 | Knoos | 126/271 |
| 4,064,868 | 12/1977 | Nussbaum | 126/271 |

OTHER PUBLICATIONS

Whillier, "Black-Painted Solar Air Heater of Conventional Design", Solar Energy, vol. 8, No. 1, pp. 31-37, Pergamon Press (1964).
Selcuk, "Thermal and Economic Analysis of the Overlapped-Glass Plate Solar-Air-Heater", Solar Energy, vol. 13, pp. 165-191, Pergamon Press (1971).
Henderson et al., "Performance of a Matrix Solar Collector for Heating Air", 1975 Annual Meeting of the American Society of Agricultural Engineer, 6/22-25, 1975, pp. 75-3005.
Edward et al., "End-Clearance Effects on Rectangular-Honeycomb Solar Collector", Solar Energy, vol. 18, pp. 253-257, Pergamon Press (1976).
Holland, "Honeycomb Devices in Flat-Plate Solar Collectors", Solar Energy, vol. 9, No. 3, pp. 159-164 (1965).
Buchberg et al., "Performance Characteristics of Rectangular Honeycomb Solar-Thermal Converters", Solar Energy, No. 13, pp. 193-221, Pergamon Press (1971).
Bevill et al., "A Solar Energy Collector for Heating Air", Solar Energy, vol. 12, pp. 19-29, Pergamon Press (1968).
Lalude, et al., "Design and Application of Honeycomb Porous-Bed Solar Air Heater", Solar Energy, vol. 13, pp. 223-242, Pergamon Press (1971).
Chun et al., "Effect of a Mylar Honeycomb Layer on Solar Collector Performance", 1974 Winter Annual Meeting of ASME (Paper No. 74-WA/HT-11).
Marshall et al., "Use of Lexan and Kapton Honeycombs to Increase Solar Energy Efficiency", 16th National Heat Transfer Conference, St. Louis, Mo., 8/8-11, 1976.
Bliss, "Solar House Heating-A Panel", Proceedings, World Symposium of Applied Solar Energy, Phoenix, 1955, pp. 151-158.

*Primary Examiner*—James C. Yeung
*Attorney, Agent, or Firm*—Gary L. Wamer

[57] ABSTRACT

A solar air heater including a housing having a transparent front wall and an inlet and outlet for establishing a flow path for a gas such as air to be heated and a porous radiation absorbent collector plate positioned across the flow path and arranged to accept incident solar radiation passing through the front wall wherein a radiation trap is placed inside the housing either adjacent to the front wall, directly on top of the collector plate or between the collector plate and the front wall. The radiation trap has a cellular structure such as honeycomb and is made from a material which is light-transmitting but opaque to infrared radiation emitted from the collector plate in a direction toward the front wall. When the radiation trap is placed adjacent to the front wall the trap can additionally serve as an air buffer layer. In this instance, however, the radiation trap must be maintained in at least firm mechanical contact with the front wall and preferably the trap is actually bonded to the front wall.

34 Claims, 27 Drawing Figures

FIG. 5
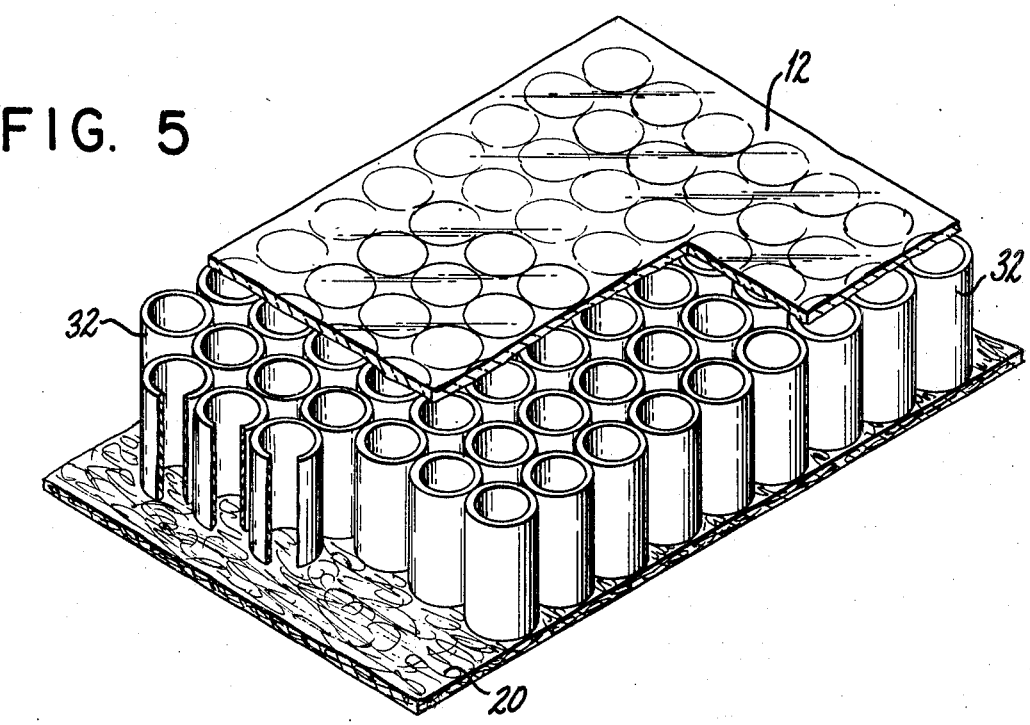
Comparison of Transmission Efficiency of Reflecting and Transparent Rectangular Honeycombs
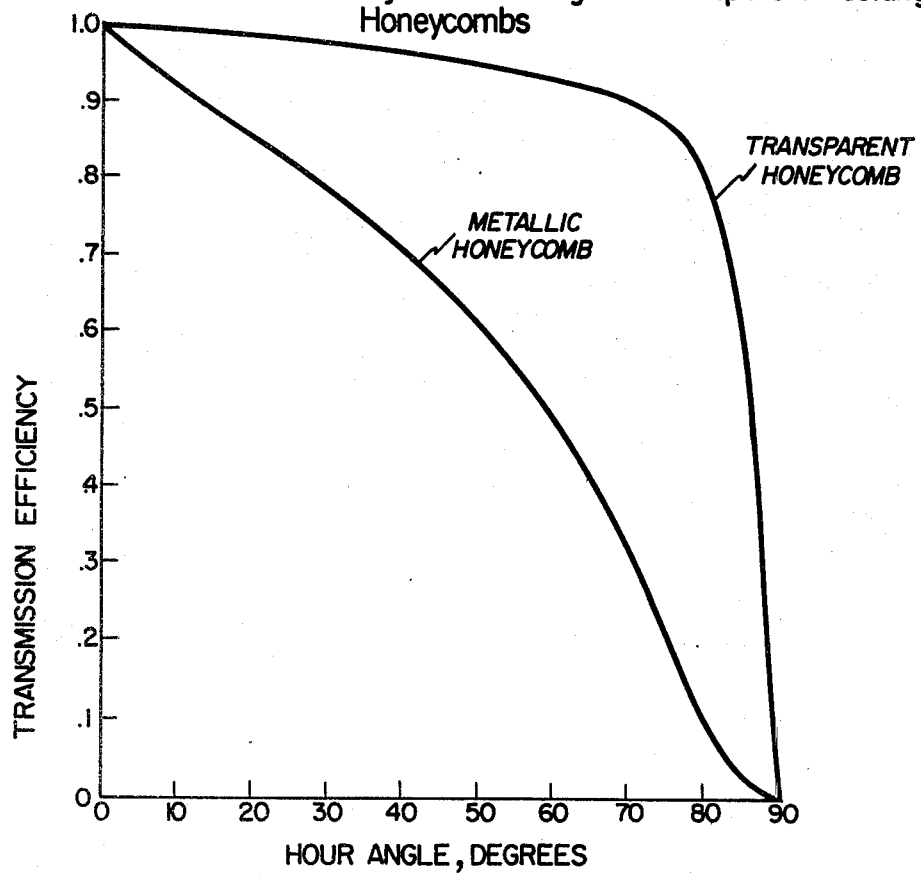
FIG. 20

FIG. 13
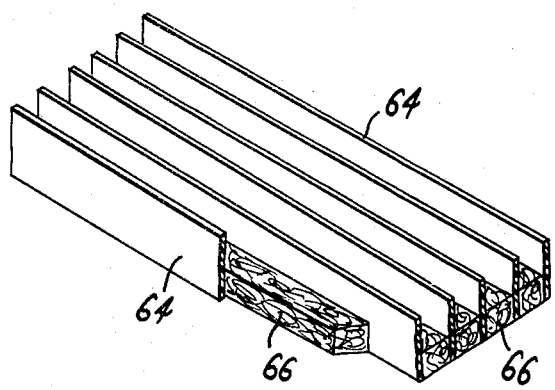
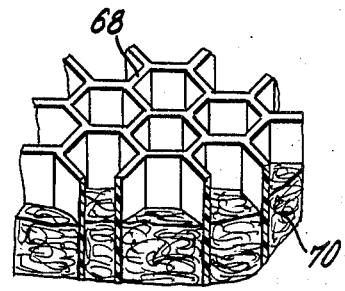
FIG. 14
FIG. 15
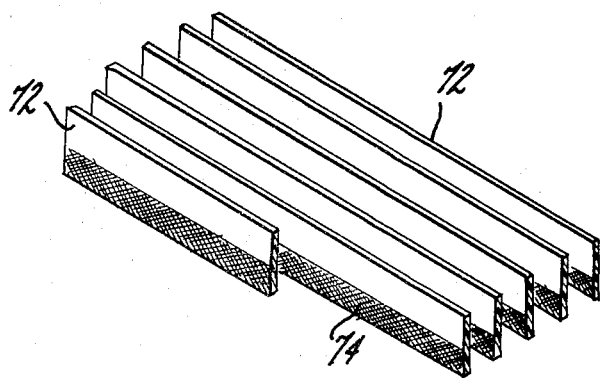
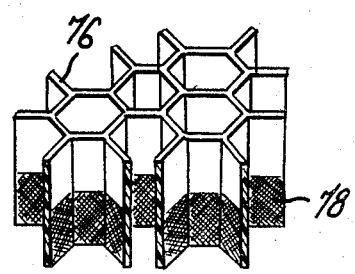
FIG. 16
Transparent Honeycomb
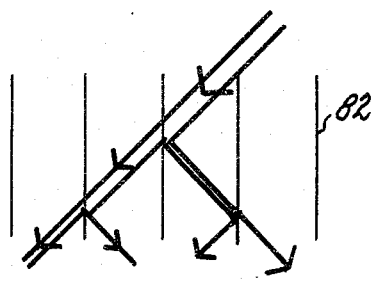
FIG. 18
Specularly Reflecting Honeycomb
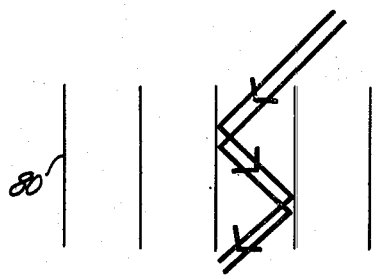
FIG. 19

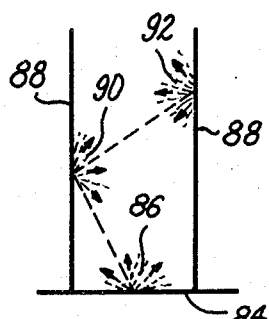
FIG. 21
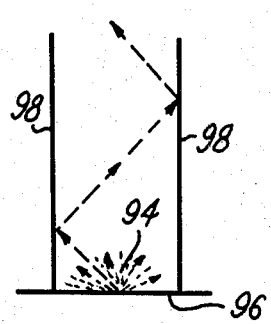
FIG. 22
FIG. 24
EFFECT OF HONEYCOMB ON EFFICIENCY OF TRANSPIRATION AIR HEATERS AND FLAT PLATE WATER HEATERS
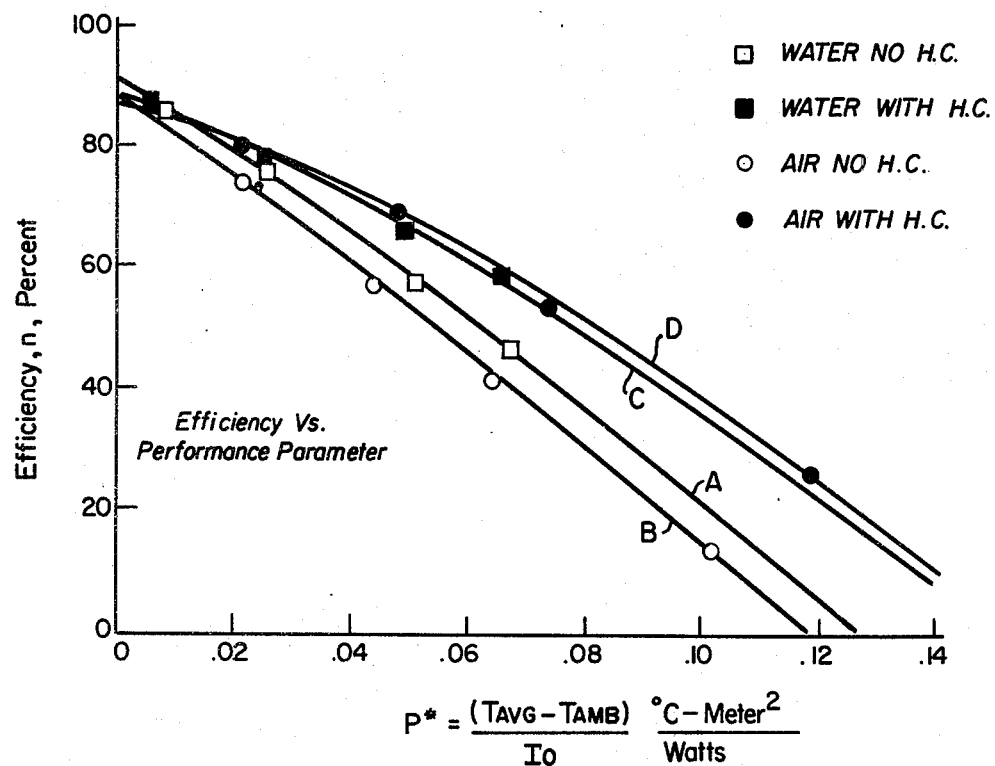
$$P^* = \frac{(T_{AVG} - T_{AMB})}{I_o} \quad \frac{°C\text{-Meter}^2}{\text{Watts}}$$

SOLAR AIR HEATER

The present application is a Continuation-In-Part of our earlier filed copending application Ser. No. 712,139, filed on Aug. 6, 1976, abandoned.

BACKGROUND OF THE INVENTION (1) Field of the Invention

The present invention relates to the field of solar collectors and more particularly to solar air heaters having improved thermal efficiencies.

(2) Description of the Prior Art

A great deal of effort has been devoted by researchers in recent years to develop solar collectors for the conversion of solar energy into heat energy. These devices are potentially useful in many applications where fossil fuels are now employed as the principal sources of energy. Such applications include for example the heating of residential and commercial buildings, and the generation of electric power. Solar collectors may be widely used sometime in the not too distant future on roof tops of residential homes for supplying heat during periods of cold weather. It is of course of the utmost importance in coming years to be able to manufacture solar collectors which are relatively inexpensive and which have a high degree of thermal efficiency.

Solar collectors heretofore developed employ a collector plate for converting solar energy into heat. Typically, the collector plate is disposed inside a housing having a light-transmitting wall for passing incident solar radiation. The solar radiation passing through the wall is absorbed by the collector plate or absorber and converted into heat. The converted heat energy is then transferred to a fluid, and heats the fluid. The heated fluid is then conveyed away for storage and subsequent utilization.

In one type of solar collector the fluid to be heated is circulated through tubes or ducts for example, positioned inside or adjacent the collector plate. The collector plate in these solar collectors is usually a solid flat radiation absorbent plate, e.g., a darkened or black metal plate which absorbs the incident solar energy and transfers it as heat by conduction to the tubes or ducts where heat exchange with the fluid occurs. Solar collector devices of this type are, therefore, commonly referred to as "flat plate collectors" and they may be used to heat a liquid or gaseous medium.

When the converted heat is to be transferred only to a gaseous medium such as air, other collector designs may be used. An excellent background study of prior art solar air heaters is given in an article by A. Whillier entitled "Black-Painted Solar Air Heaters of Conventional Design", appearing in Solar Energy, Vol. 8, No. 1, pages 27–31, Pergamon Press (1964).

In one type of solar air heater the gas is passed through the housing through the collector plate, where the collector plate is a porous, gas-permeable plate, e.g. a porous black fiber mat, and the gas to be heated passes directly through the solar energy absorbing surface. Also, in this instance, the housing has an inlet and an outlet for establishing a flow path for the gas to be heated. In porous plate designs the entire collector plate acts as a heat exchange medium for transferring the absorbed or converted heat to the gas or air flowing through the device. Thus, gas or air is drawn through the inlet and flows or transpires through the collector plate and is heated. The heated gas or air exits through the outlet and is conveyed to a storage device for subsequent use. Solar collectors of this type are referred to as so-called "transpiration solar air heaters".

A major problem with solar collectors is the loss of absorbed heat by natural convection and reradiation, i.e. long-wave or infrared radiation, from the collector plate toward the light-transmitting wall.

It has been proposed in the literature to employ certain types of cellular structures such as honeycombs as a heat trap to reduce the loss of absorbed heat by natural convection in flat plate solar heaters. The heat trap is placed over the solid collector plate to guard against the development of convective heat flow away from the collector plate and toward the light-transmitting wall. Any heat that is conveyed by this convective flow to the wall can be readily lost through conduction or radiation to the outside atmosphere. Thus, Hollands in an article entitled "Honeycomb Devices in Flat Plate Solar Collectors", Solar energy, Vol. 9, No. 3, pp. 159–169, Pergamon Press (1965) discloses the use of various types of honeycomb structures, e.g., rectangular, square, triangular, etc. as a heat trap to prevent convective losses in a flat plate solar heater. The honeycomb trap can be made of glass or plastics which transmit solar rays but are opaque to long-wave radiation. In transpiration solar air heaters, of course, the loss of heat by natural convection does not occur if the gas or air to be heated continuously flows through the porous collector plate or absorber in a direction away from the light-transmitting wall.

Various attempts have also been made in the prior art to overcome the problem of reradiation losses. In flat plate collectors, spectrally selective coatings may be applied to the absorber surface to reduce reradiation losses. A review of spectrally selective coating technology is given by J. Jurisson, R. E. Peterson, and H. Y. B. Mar in an article entitled "Principles and Applications of Selective Solar Coatings" appearing in the Journal of Vacuum Science Technology, Vol. 12, No. 5, pages 1010–1015 (1975). The coatings described, however, are not effective in reducing reradiation losses from transpiration air heaters because the pores at the surface of a porous plate act as black body cavities and limit the effectiveness of any coating applied to the surface.

Various attempts have also been made in the prior art to overcome the problem of reradiation losses from transpiration solar air heaters. Thus, U.S. Pat. No. 3,102,532 to Shoemaker discloses a solar collector wherein air to be heated is passed through a gas-permeable absorber composed of multilayers of slit and expanded aluminum foil. The expanded foil is coated with a black vinyl enamel on the top surface facing the light-transmitting wall. The bright underside of the foil is highly reflective and acts as a trap to prevent loss of absorbed heat by reradiation. However, some radiation losses can occur through the openings or slits in the foil.

It has also been proposed in the literature to utilize a specularly reflecting honeycomb heat trap in a solar air heater employing a porous collector plate. Thus, Buchberg et. al., in an article entitled "Performance Characteristics of Rectangular Honeycomb Solar Thermal Convertors", Solar Energy, No. 13, pages 193–221, Pergamon Press (1971), disclose a solar air heater employing a rectangular honeycomb heat trap which is made from a specularly reflective material, e.g., aluminized paper coated with a clear resin layer.

U.S. Pat. No. 4,015,582 to Liu et al discloses a solar heat collector which employs a layer of light-transmitting insulating material which serves as an air buffer and infrared radiation trap. The combined buffer and radiation trap may be positioned between the outer surface of the collector and the radiation absorbing collector plate. The light-transmitting insulating material may be transparent glass fibers or honeycomb, for example, and is held or sandwiched between the outer collector surface and an inner non-porous layer of an air-impermeable, light-transmitting material. This solar collector design suffers from the disadvantage that the inner non-porous air impermeable layer, e.g., clear plastic or glass, is reflective of incident solar radiation and actually accounts for a significant loss in absorbed heat when the collector is operated under conditions typical of those that are encountered in space heating using solar air heaters.

U.S. Pat. No. 4,018,211 to Barr discloses a solar collector which employs at least one insulating light-transmitting honeycomb layer sandwiched between two layers of transparent material, e.g. glass, and at least one other light-transmitting honeycomb layer which serves as a heat transfer medium. The light-transmitting honeycomb layers are of such large dimension that they preclude the effective use of the honeycomb as an infrared radiation trap.

It is an object of the present invention to provide a solar air heater employing a porous collector plate and a light-transmitting tradiation trap which has improved thermal efficiencies.

Another object of the present invention is to provide a solar air heater of the type described which is easy to assemble and economical to manufacture.

SUMMARY OF THE INVENTION

It has been discovered in accordance with the present invention that a significant improvement in thermal efficiencies can be obtained in a solar air heater employing a porous collector plate if a radiation trap which is made from a material that is light-transmitting and opaque or black to infrared radiation, e.g., clear plastic or glass honeycomb, is placed on top of the collector plate or spaced between the collector plate and the light-transmitting front wall.

It has been further found that the most significant improvement and consequently the highest thermal efficiencies can be attained if the radiation trap is placed adjacent to and in contact with the front wall. The radiation trap should be composed of a multiplicity of open cells in communication with the flow of gas or air through the solar heater, the cells having walls substantially perpendicular to the front wall which act as baffles to prevent the flow of air through the radiation trap in a direction parallel to the plane of the front wall but which at the same time do not cause reflections of incident sunlight in a direction toward the front wall during periods of normal operation. In particular, the radiation trap may be made from plastic or glass honeycomb with cells of various geometries, e.g., rectangular or hexagonal, or other cellular structures such as those provided by spaced apart parallel fins arranged across the flow of air through the collector. Solar air heaters can be made in accordance with the present invention for applications such as space heating having thermal efficiencies ranging between about 60 and 70 percent. These thermal efficiencies include, of course, the normal heat loss due to the transmission of solar radiation through the light-transmitting front wall.

Briefly then, the present invention resides in a solar air heater comprising a housing having a light-transmitting front wall and an inlet and an outlet for establishing a flow path for a gas such as air to be heated. A porous or gas-permeable collector plate or absorber is disposed across the flow path in the housing and is arranged to accept the incident solar radiation passing through the front wall and to transfer the absorbed heat to the gas or air passing along the flow path and through the collector plate or absorber. A transparent radiation trap of the structure described above, and which is opaque or black to infrared radiation, e.g., clear plastic or glass honeycomb or fins, is interposed between the collector plate or absorber and the front wall.

As indicated, the radiation trap may be positioned in several different locations with respect to both the porous collector plate and the front wall. Thus, the radiation trap may be placed directly on top of the porous collector plate and in spaced apart relation to the front wall. In this embodiment of the present invention, the gas or air to be heated passes through the space between the front wall and the porous collector plate and then through both the trap and the collector plate or absorber.

In the preferred embodiment of the present invention, the radiation trap is positioned adjacent to and in contact with the front wall. The gas or air to be heated, in this instance, passes directly through the porous collector plate without entering the radiation trap.

BRIEF DESCRIPTION OF THE DRAWING

The present invention will be described in greater detail hereinafter with particular reference to the accompanying drawing in which the same numerals identify the same or corresponding parts and in which:

FIGS. 2–5 are perspective views of part of a solar air heater employing different forms of a radiation trap in accordance with the present invention;

FIGS. 13–16 are perspective views of part of a solar air heater showing several different modifications of the porous collector plate-radiation trap arrangement that may also be employed in accordance with the present invention;

FIG. 18 is a schematic view showing transmission of solar radiation through a transparent honeycomb structure;

FIG. 19 is a similar schematic view showing transmission of solar radiation through a specularly reflecting honeycomb;

FIG. 20 is a graph showing a comparison of the transmission properties of transparent and specular honeycombs;

FIG. 21 is a schematic view showing the infrared radiation exchange between the porous collector plate and the infrared absorbing cell walls of a glass or plastic honeycomb;

FIG. 22 is a similar schematic view showing the infrared radiation exchange between the porous collector plate and the infrared reflecting cell walls of a metallic honeycomb;

FIG. 24 is a graph showing the relationship between the thermal efficiencies and operating conditions for water and air heaters both with and without a honeycomb radiation trap;

DESCRIPTION OF THE PREFERRED EMBODIMENTS

Figure 1:
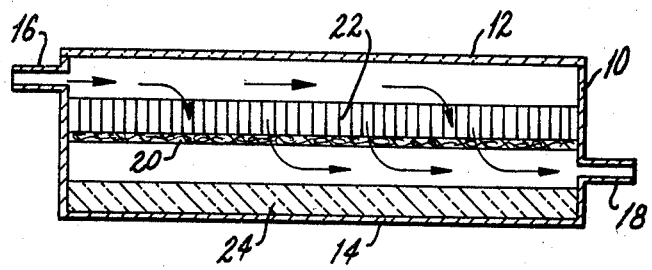
FIG. 1 is a cross-sectional, elevational view of a solar air heater embodying the present invention.

Referring now specifically to FIG. 1 of the drawing, there is shown a solar air heater embodying the present invention. The solar heater comprises a housing 10 having a light-transmitting front wall 12 which passes incident solar radiation and a back wall 14. The front wall 12 is preferably made from a clear or transparent material having a relatively low reflectivity and which is non-porous and gas impermeable, e.g. clear plastic or glass. The housing 10 further includes an inlet 16 in one side wall and an outlet 18 in the opposite wall. The inlet 16 and outlet 18 are arranged to establish a flow path for a gas such as air to be heated as generally indicated by the arrows in the drawing. A porous, radiation absorbent collector plate 20 is mounted inside the housing 10 in spaced apart parallel relation to both the front wall 12 and back wall 14 and across the flow path established between the inlet 16 and outlet 18. The porous collector plate 20 may be composed, for example, of a porous darkened or black fibrous mat, woven or stamped screen or a reticulated foam. A light-transmitting radiation trap 22 is placed in contact with the top surface of porous collector plate 20 facing the front wall 12. The radiation trap 22 is preferably made from a clear or transparent material and has an open structure such as a honeycomb which permits the flow of gas or air through both the trap 22 and the porous collector 20. Preferably, although not necessarily, a layer of insulation 24 is placed adjacent to the back wall 14. The housing 10 may suitably be made of metal such as aluminum or steel for ruggedness or the housing can also be made of an insulating material such as polymeric foam or fiberglass if desired.

Figure 2:
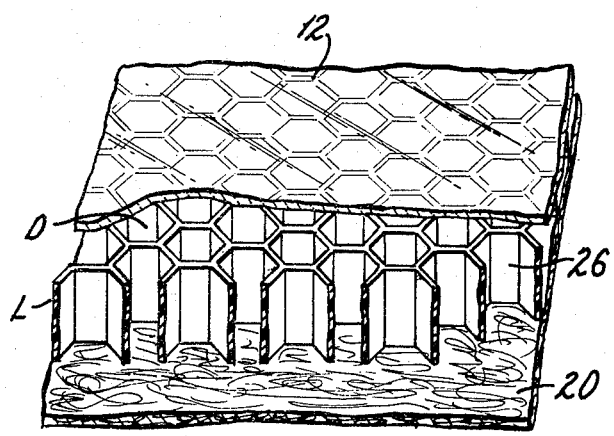

FIGS. 2–5 show various forms of the radiation trap that may be used in a solar air heater in accordance with the present invention. Thus, the radiation trap may be made from a transparent hexagonal honeycomb panel 26 as shown in FIG. 2. The honeycomb panel 26 is positioned on top of the porous collector plate 20 and in spaced relation to the front wall 12. As shown, the honeycomb panel 26 is composed of a multiplicity of hexagonal cells which are defined by common walls having a predetermined length "L" and a cross-section of typical dimension or diameter "D". The ratio of cell length "L" to diameter "D" should be maintained in the range of between about 2 and 10.

Figure 3:
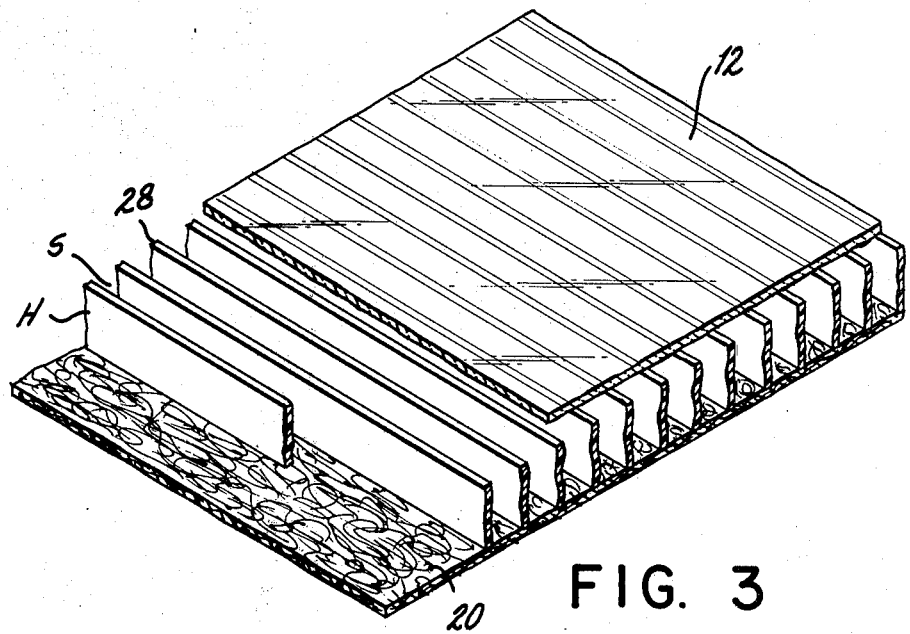

FIG. 3 shows a different form of the radiation trap which is composed of a series of spaced apart parallel fins 28. The fins 28 are maintained in position on top of the porous collector plate 20 by any suitable means such as support struts (not shown) affixed to the side walls of the housing 10. Preferably, the ratio of fin height "H" to spacing "S" as shown in the drawing should be maintained in the range of between about 4 and 20.

Figure 4:
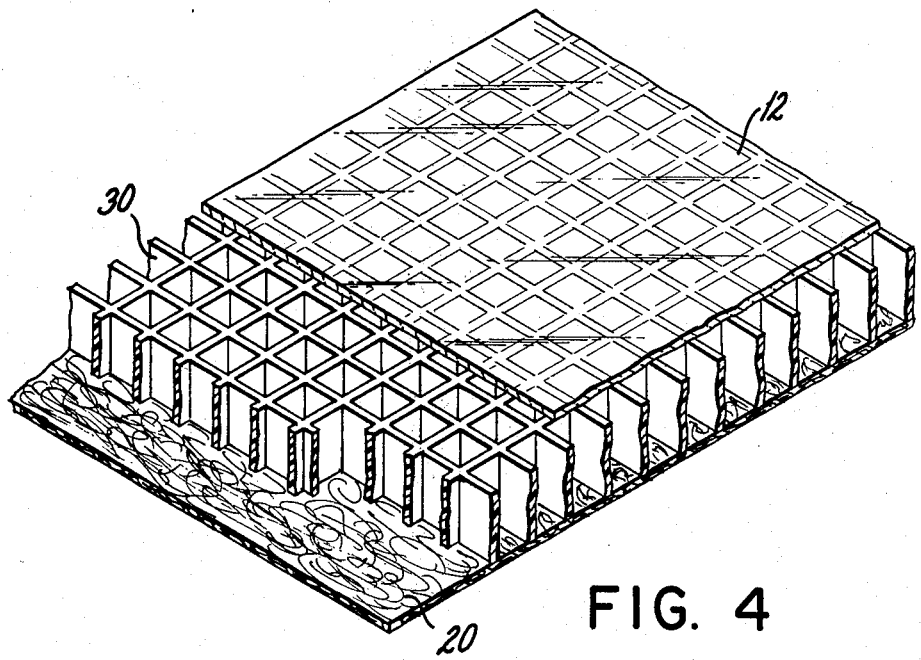

FIG. 4 shows still another form of radiation trap which is made from a rectangular honeycomb panel 30. This form of radiation trap is basically the same as that shown in FIG. 2 except for the specific configuration of the honeycomb.

In FIG. 5, there is shown another form of radiation trap which is made from a multiplicity of transparent plastic or glass tubular segments 32. The tubular segments 32 are glued or otherwise bonded together such as by solvent to form an elongated panel which is also placed on top of the porous collector plate 20 is spaced apart relation to the transparent wall 12. Suitably, the tubular segments 32 may be cut from conventional plastic or glass tubes or straws, for example. The ratio of tube length to diameter is substantially the same as that for the hexagonal honeycomb trap shown in FIG. 2.

It will be understood that the construction of the radiation traps used in accordance with the present invention is not restricted to the specific geometries described hereinabove but that the traps may be made from other types of cellular geometries or open structures such as triangular honeycomb cells or cells constructed from corrugated or pleated sheets. Although the radiation traps are most preferably made from cellular honeycomb structures, other open structures having a high aspect ratio (equivalent L/D for non-circular geometries) may be used in the practice of the present invention.

The radiation traps used in solar air heaters may be made from any light-transmitting material which is at the same time opaque or black to infrared radiation. The radiation traps may of course be translucent if desired but preferably the traps are made of a transparent material such as a clear plastic or glass, for example. There are a number of clear plastic compositions which are black or opaque to infrared radiation and which, therefore, can be used in the practice of the invention. These plastic compositions include, for example, polyvinyl fluoride, polycarbonate, fluorinated ethylene propylene, polymethyl methacrylate, aromatic polysulfones, polyethylene terephthalate, aromatic polyesters, polyvinylidene fluoride, hexafluoropropylene, chlorotrifluoroethylene and tetrafluoroethylene copolymers.

Generally speaking, the trap may be located in any of several different positions between the porous collector plate 20 and the front wall 12. In the embodiment of the solar air heater shown in FIG. 1, the radiation trap is located directly on top and in contact with the porous collector plate 20 and in spaced apart relation to the front wall 12. This embodiment of the solar heater offers an advantage in that the flow of gas or air directly through the honeycomb radiation trap tends to recover some of the heat which is lost from the porous collector plate 20 to the trap 22 by conduction and radiation. However, the gas or air to be heated at the same time passes directly underneath the front wall 12 and this can increase the heat losses through the wall to the ambient atmosphere.

Figure 6:
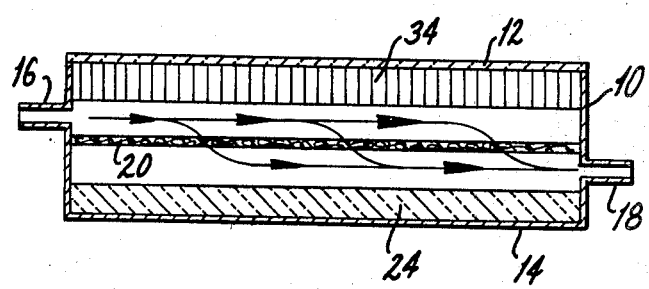
FIG. 6 is a cross-sectional, elevational view of a solar air heater similar to FIG. 1 showing a preferred embodiment of the present invention.
Figure 32:
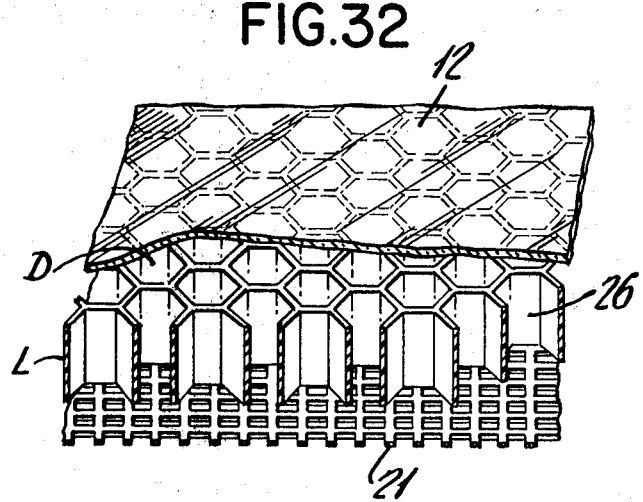
FIG. 32 is a perspective view of part of the solar air heater employing a radiation trap having a cellular structure held in firm contact against said front wall by an open support means comprising an open mesh 21 placed against the side of said cellular structure opposite to said front wall.
Figure 33:
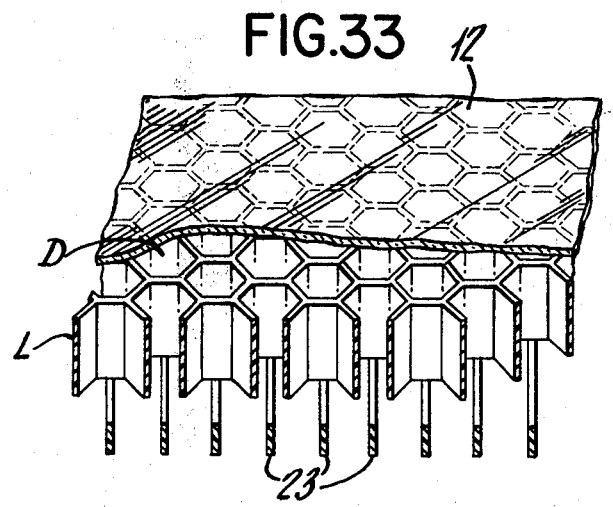
FIG. 33 is a perspective view of part of the solar air heater employing a radiation trap having a cellular structure held in firm contact against said front wall by an open support means comprising a plurality of spaced apart, parallel bars 23 placed against the side of said cellular structure opposite to said front wall.

A more preferred embodiment of a solar air heater in accordance with the present invention is shown in FIG. 6. The solar air heater is of basically the same construction as that described above except that the radiation trap 34 in this instance is located just beneath the front wall 12 and in spaced apart relation to the porous collector plate 20. The gas or air to be heated enters the inlet 16, passes through the space between the radiation trap 34 and the porous collector plate 20, and then passes through the collector plate 20 where the gas or air is heated by absorbed radiation. It should be noted that in this embodiment the gas or air does not flow through the radiation trap. The radiation trap 34 serves the additional function of providing a nearly stagnant air buffer layer between the air flow and front wall 12. This further reduces the heat losses to the surrounding or ambient atmosphere. In order to effectively function as an air buffer, the radiation trap 34 should be maintained in at least firm mechanical contact with the underneath side of the front wall 12 and preferably should be bonded to the wall in order to prevent the flow of gas or air through the trap and into contact with the front wall 12. Further, it will be noted in those instances where it might not be practical or feasible to bond the radiation trap 34 to the front wall 12, the trap might be readily held in firm mechanical contact with the wall by an open support structure such as open mesh (shown in FIG. 32 as open mesh 21) or parallel bars (shown in FIG. 33 as parallel bars 23) positioned below the trap. The support structure must of course be open to minimize the introduction of additional losses by reflection of solar radiation back toward the front wall 12 from the support structure.

Figure 7:
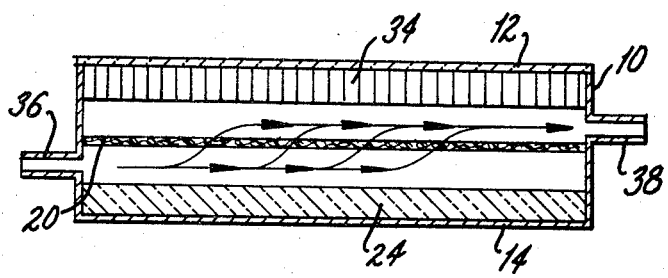
FIGS. 7–11 are cross-sectional, elevational views of solar heaters showing a number of modifications that can be employed in the preferred embodiment shown in FIG. 6.

FIG. 7 shows a modification of the solar air heater which is basically the same construction as that of FIG. 6 except that the flow of gas or air in this instance is in the reverse direction. The gas or air to be heated enters the inlet 36 which is located below the porous collector plate 20 and passes through the space between the collector plate 20 and back wall 14. The gas or air then passes through the collector plate 20 and is heated by absorbed radiation. The heated gas or air exits through the outlet 38 which in this instance is located between the radiation trap 34 and the collector plate 20.

There are a number of additional modifications of the solar air heater which are made possible by relocating the radiation trap to another position other than on top of the porous collector plate 20 such as by placing the trap directly underneath the front wall 12. Thus, it is possible for example to locate the collector plate or absorber in several different positions independently of the radiation trap.

Figure 8:
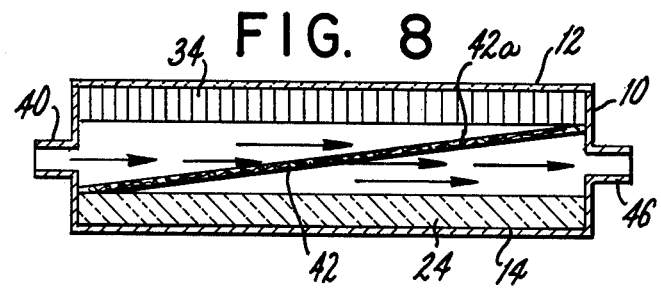
Figure 9:
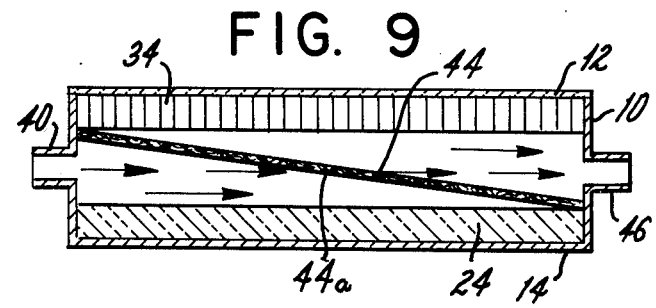

FIGS. 8 and 9 show two such modifications wherein the porous collector plate is positioned in non-parallel relation to both the radiation trap 34 and the front wall 12. The gas or air to be heated enters the inlet 40 in one side wall of housing 10 and flows through the non-parallel porous collector plate in a direction either first through the upper surfaces 42a of the collector plate 42 as shown in FIG. 8 or first through the bottom surfaces 44a of the collector plate 44 as shown in FIG. 9 and is heated by the absorbed radiation. The heated gas or air then exits through an outlet 46. In both of these modifications, it will be noted that the gas or air flows directly through the collector plates 42, 44 without changing direction as denoted by the arrows in the drawing, thus assuring a more uniform flow through the solar heater.

Figure 10:
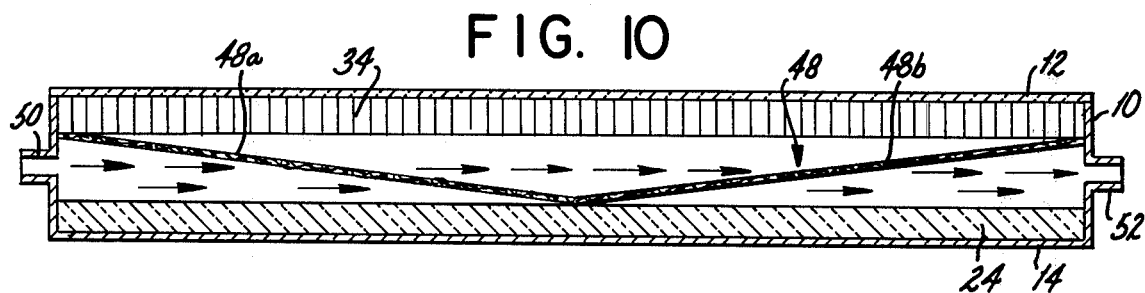

FIG. 10 shows another modification which combines the features of the solar heaters illustrated in FIGS. 8 and 9. In this modification, the two non-parallel collector plates are combined into one solar heater with the porous collector plate 48 being arranged in a V-shaped configuration. The gas or air to be heated enters the inlet 50, passes first through the non-parallel segment 48a of the V-shaped collector plate 48 and then through the other non-parallel segment 48b again without changing direction and exits through the outlet 52. It will be noted however that in this instance a two-stage heating effect is achieved in a single solar heater unit. The collector plate segments 48a and 48b may of course be constructed in one piece or they may be made from two pieces suitably joined together in the solar air heater. Generally speaking, any number of porous collector elements may be combined in non-parallel relation to the front wall to provide a multiple stage heating effect in a single solar heater unit.

Figure 11:
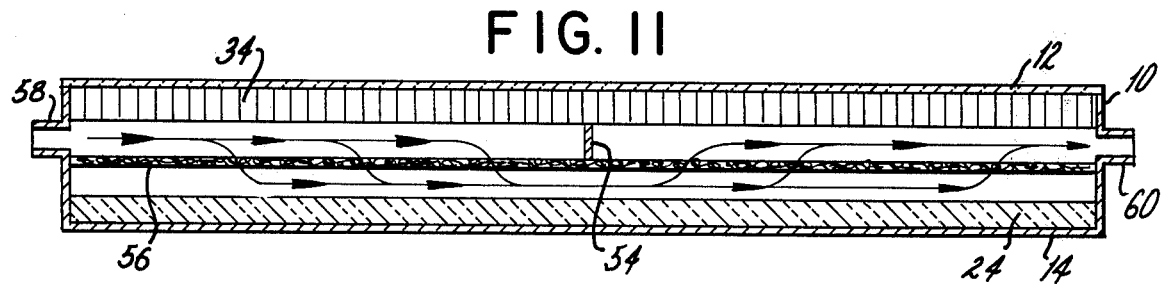

A similar two stage heating effect can be achieved by a further modification of the solar air heater as shown in FIG. 11. This modification similarly combines the features of the solar heaters illustrated in FIGS. 6 and 7. Thus, as shown, a baffle plate 54 is disposed intermediate the length of the housing 10 and between the radiation trap 34 and the flat porous collector plate 56. An inlet 58 and outlet 60 are located on the same side of the collector plate 56. The gas or air enters the inlet 58 and passes through the space between the radiation trap 34 and the collector plate 56. The gas or air is then made to pass through the porous collector plate 56 by the baffle plate 54 and is heated by the absorbed radiation. The heated gas or air enters the lower space between the collector plate 56 and the back wall 14 and is again made to pass through the collector plate 56 being heated by absorbed radiation. The heated gas or air then exits through the outlet 60.

Figure 12:
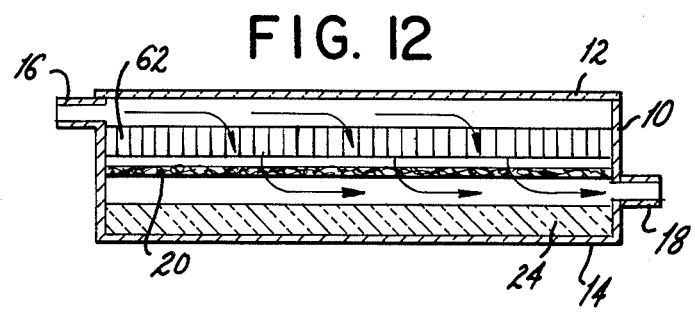
FIG. 12 is a cross-sectional, elevational view of a solar air heater showing another embodiment of the present invention.

FIG. 12 shows still another embodiment of a solar air heater in accordance with the present invention. This solar air heater is of basically the same construction as that shown in FIG. 1 except that the radiation trap 62 is located at a position which is intermediate and spaced from both the collector plate 20 and the front wall 12.

An advantage of this embodiment of the solar air heater is that the radiation trap is not maintained in contact with collector plate 20 but is rather spaced therefrom and consequently there are no heat losses due to conduction of heat through the collector plate to the radiation trap.

It will be noted of course that any one of the different forms of the radiation trap shown in FIGS. 2-5 may be employed in the further embodiments and modifications of the solar air heater just described. Thus, it is possible, for example, to use an hexagonal, rectangular or tubular honeycomb radiation trap such as shown in FIGS. 2, 4 and 5, respectively, or the radiation trap may be composed of parallel fins such as shown in FIG. 3. It should be noted, however, that in those instances where the trap is made from parallel fins, the fins must be oriented such that they are arranged in a direction substantially perpendicular to the direction of flow of the gas or air through the solar heater. If, on the other hand, the fins are arranged in the same direction as the flow of gas or air to be heated, the radiation trap cannot function as an air buffer and heat losses through the front wall 12 are likely to occur. As already indicated, the radiation trap used in these embodiments must of course be made of light-transmitting material which can be translucent, clear or transparent and which must of course be black or opaque to infrared radiation. In addition to the several different forms of radiation traps already described and illustrated herein, there are of course other types of materials which will function as radiation traps such as plastic or glass fiber batts or fused plastic films containing entrapped gas bubbles. In this connection, it should be noted that an open fibrous structure made of plastic or glass would function as a radiation trap but would not function as both a radiation trap and air buffer without the interposition of a non-porous, gas-impermeable layer between the fibers and the gas or air flow through the solar heater. Also, it should be noted that in any one of the above described embodiments the porous collector plate or absorber can be made of the same porous heat absorbing materials as described above such as a black fibrous mat, woven or stamped screen or reticulated foam.

It may be practical and economical in some cases to incorporate both the radiation trap and porous collector or absorber together in one element during manufacture of the solar air heater. Thus, as shown in FIG. 13, the space between the parallel fins 64, which constitute the radiation trap, may be partially filled with porous heat absorbing material 66. Similarly, the voids defined by the hexagonal honeycomb 68 may be partially filled with the same porous heat absorbing material 70 as depicted in FIG. 14. It is also possible to construct a radiation trap-absorber element by coloring a lower portion of the fins 72 with a black or darkened paint or other coloring agent as indicated at 74 in FIG. 15. FIG. 16 shows the same type of radiation trap-absorber element using the hexagonal honeycomb 76 wherein the lowermost portion of the honeycomb is colored with a black or darkened paint or coloring agent as indicated at 78 in FIG. 16. It may be noted that all the embodiments shown in FIGS. 13-16 correspond substantially to the embodiments of the present invention shown in FIG. 1 wherein the radiation trap is disposed on top of the porous collector plate. It may be further noted that the clear upper portion of the radiation trap-absorber element must have an aspect ratio which is in the same range as that described for the radiation traps shown in FIGS. 2-5.

Figure 17:
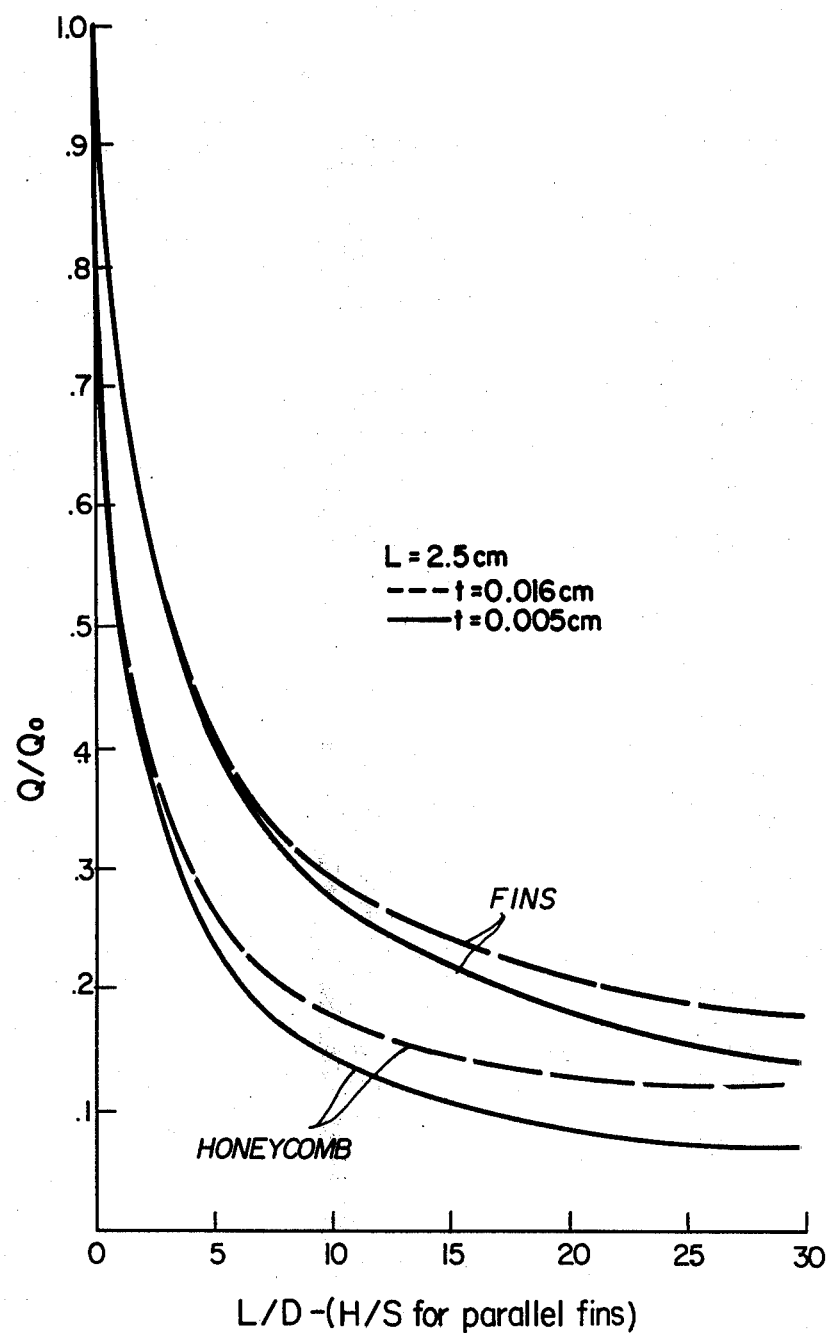
FIG. 17 is a graph showing the normalized radiative heat loss through honeycomb and fin radiation traps.

As hereinabove mentioned, the radiation traps made from cellular honeycomb are preferably used in solar air heaters although other types of geometries can be employed as the radiation trap in the practice of the present invention. Generally speaking, the amount of reduction of heat loss that is achieved with radiation traps of various geometries will depend on the aspect ratio and will be within a range encompassed by tubular or hexagonal honeycomb and parallel fin radiation traps. In order to quantify this relationship, a theoretical analysis was conducted to determine the amount of radiation trapping achieved by honeycomb and parallel fins of different apsect ratios. The results of this analysis are shown in FIG. 17 where values for $Q/Q_o$ were plotted against the aspect ratio L/D (or the equivalent H/S for parallel fins). In the graph, Q is the rate of heat loss from one black surface at 100° C. to another black surface at 0° C. with the radiation trap in place, while $Q_o$ is the rate of heat loss between the same two surfaces without the radiation trap present. The ratio of $Q/Q_o$ is a measure of the effectiveness of the radiation trap, with low values of $Q/Q_o$ indicating more effective heat loss reduction. As seen from FIG. 17, the honeycomb radiation trap is more effective than the parallel fins. It may be further seen that in order to achieve at least a 50 percent reduction in radiation heat loss the aspect ratio L/D for honeycombs must be greater than 2 and that the aspect ratio for parallel fins must be greater than 4. As also seen from FIG. 17, there is only a marginal additional reduction in heat loss achieved by using honeycombs with aspect ratios larger than 10 or parallel fins with aspect ratios larger than 20.

FIG. 17 further shows the effect of cell wall or fin thickness on heat loss reduction. Thus, the solid curves represent a cell wall or fin thickness of 0.005 centimeters while the dotted curves represent a cell wall or fin thickness of 0.016 centimeters. As will be clearly seen from the curves, the thinner cell wall and fin dimensions provide more effective heat loss reduction. Preferably, in the practice of the present invention, the thickness of the honeycomb cell walls and fins should be maintained in the range from about 0.0002 to about 0.05 centimeters. It should be further noted that the thickness of the cell walls and fins as shown for example in FIGS. 2-5 have been exaggerated for purposes of illustration.

FIGS. 18 and 19 schematically show the different mechanisms that are involved in the transmission of incident sunlight through transparent honeycombs and specularly reflecting honeycombs such as already employed in the prior art by Buchberg et.al. supra. The solar rays are transmitted through the honeycombs in either of two ways, namely by reflection or direct transmission of the solar rays. In the case of the specularly reflecting honeycomb 80, the solar rays are transmitted solely by reflection as clearly depicted by the arrows in the schematic view of FIG. 19. Conversely, the solar rays are transmitted by both reflection and direct transmission in the case of the transparent honeycomb 82 as shown by the arrows in the schematic view of FIG. 18.

The dual mechanisms of combined reflection and transmission results in a higher overall transmission efficiency for transparent honeycomb compared to specularly reflecting honeycomb. Thus, when the transparent honeycomb is used as a radiation trap versus a reflective honeycomb, a higher fraction of the incident sunlight will be transmitted to the collector plate or absorber where it is converted into heat. To quantify this difference, a theoretical analysis of the transmission efficiency of a clear plastic honeycomb with an aspect ratio of 10 and a highly reflecting metallized honeycomb of the same aspect ratio was performed. The results of the analysis are shown in FIG. 20 where the overall transmission efficiency of the two honeycombs is shown as a function of incident sunlight angle. It can be clearly seen that the clear or transparent honeycomb has a higher transmission than the reflecting honeycomb at all incident angles above zero. Although the dual mechanism of combined reflection and transmission has been hereinabove described in connection with transparent or clear honeycomb, it will of course be understood that the concept is valid for honeycombs made of any light-transmitting material.

While it is advantageous to make the radiation trap of a material which is transparent to solar rays, it is also necessary as indicated that the radiation trap must be absorptive of infrared or thermal radiation. The mechanism by which infrared absorption in a honeycomb, parallel fin or similar structure produces a radiation trap effect is shown schematically in FIG. 21. Thermal or infrared radiation is emitted in a diffuse manner from a given point on the collector plate or absorber 84 such as the single point depicted at 86 in the view of FIG. 21. In a radiation trap of sufficiently high aspect ratio (e.g., greater than 2 in the case of honeycomb), the greatest fraction of the emitted radiation will strike the walls of the trap 88 as shown for instance at the point 90 and will be absorbed. If any reradiation occurs from the point 90, the greatest fraction will again strike the walls of the trap 88 at another point such as at the point 92 and will also be absorbed. Conversely, as shown in FIG. 22, the emitted infrared radiation from a given point 94 on the collector plate or absorber 96 striking the walls of an infrared reflecting honeycomb, parallel fin or similar structure 98 will continue in a direction away from the collector plate 96 by means of multiple reflections as generally depicted by the arrows and there will be substantially little or no trapping of the infrared radiation.

Figure 23:
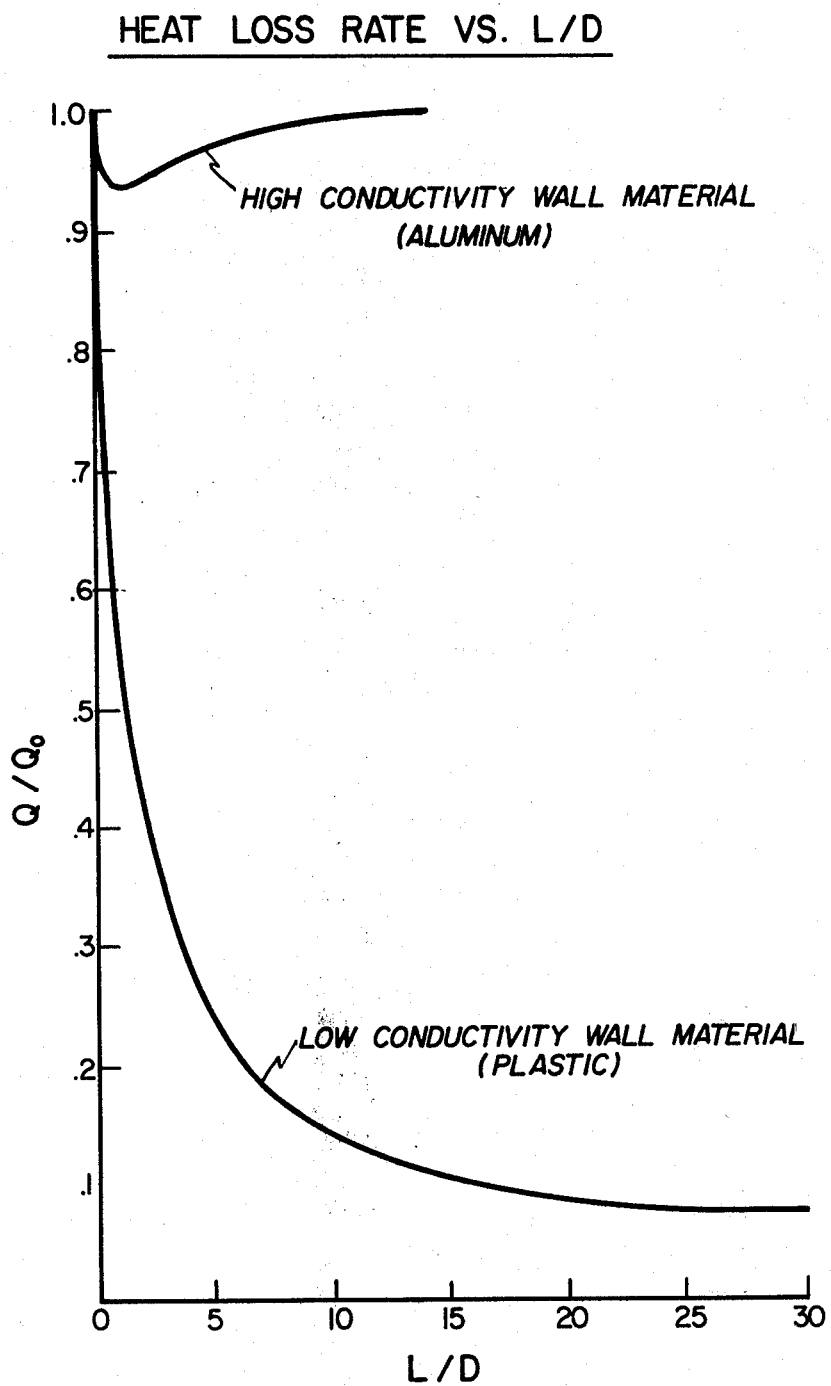
FIG. 23 is a graph showing the effect of L/D on radiative heat loss for cell walls of high and low thermal conductivity.

In addition to the optical property requirements of the radiation trap described above, it is also necessary that the trap be made from a material that possesses a low thermal conductivity, e.g., most plastics and glass. To demonstrate the importance of using a low conductivity material for the radiation trap, a theoretical analysis of the radiation trapping properties of blackened aluminum honeycomb (i.e. high conductivity material) and plastic honeycomb (i.e. low conductivity material) was performed. In this analysis, the relationship between the $Q/Q_o$ ratio as previously defined and the aspect ratio $L/D$ was studied and the results are shown in the graph of FIG. 23. It will be seen from the graph that the honeycomb which is made from a high conductivity material does not function as an effective radiation trap. This is due to the fact that large amounts of heat are conducted through the walls and offset the reduction in radiation heat transfer due to radiation trapping. The honeycomb which is made from the low conductivity material on the other hand does not suffer from this limitation and is therefore a superior radiation trap.

A series of experiments were conducted to show the unexpected results that are obtained by the use of transparent radiation traps in transpiration air heaters compared to their use in flat plate water heaters such as disclosed by Hollands supra. In the experiments, two solar heaters were constructed, one being a flat plate water heater and the other being a transpiration air heater. Both solar heaters were constructed with a single glazing (light-transmitting front wall) and an equivalent amount of thermal insulation. The two solar heaters were first tested according to procedures developed by the National Bureau of Standards described in NBSIR 74-635 to determine their thermal performance without any honeycomb between the glazing and the collector plate or absorber. The test data was recorded pursuant to procedures set up by the National Bureau of Standards wherein the thermal conversion efficiency $\eta$ is plotted against a collector performance parameter defined as $$P^* = (T_{avg} - T_{amb})/I_o$$

In this definition $T_{avg}$ is the average of the inlet and outlet temperature of the fluid (e.g. air) flowing through the solar heater and $T_{amb}$ is the temperature of the surroundings. Also in the definition, $I_o$ is the magnitude of the flux of incident solar radiation. Thus, it will be seen that the performance parameter $P^*$ is defined as the difference between average overall temperature in the collector and the ambient temperature divided by the magnitude of incident solar radiation. For space heating applications using solar air heaters, this parameter typically lies between about 0.04 and 0.08 square meter-s—degree Celsius per Watt. The results of the test for the flat plate water heater and the transpiration air heater without the honeycomb trap are shown by the curves labelled A and B, respectively, in the graph of FIG. 24.

The experiments were continued by modifying each of the two solar heaters to include a tubular honeycomb radiation trap between the glazing and the collector plate or absorber. The tubular honeycomb had an L/D ratio of 10 and was made of clear polycarbonate. The wall thickness of the tubular honeycomb was 0.009 centimeters. In the transpiration air heater, the position of the honeycomb radiation trap was similar to that shown in FIG. 6. Again, the construction of the two modified solar heaters was basically the same using a single glazing and the same insulating material. The two heaters were then again tested using the same procedures outlined above. The results of the test for the flat plate water heater and the transpiration air heater using the honeycomb radiation trap are shown by the curves labelled C and D, respectively, in the graph of FIG. 24. By reference to the two sets of curves A, B and C,D, it will be readily seen that the increase in performance efficiency is significantly larger in the case of the transpiration air heater as compared to the flat plate water heater. In fact, it will be further seen from the curves that without a honeycomb radiation trap the water heater has a higher efficiency than the transpiration heater over the entire range of operating conditions, whereas the converse is true in the case where the honeycomb radiation traps are incorporated in the two solar heaters.

Figure 25:
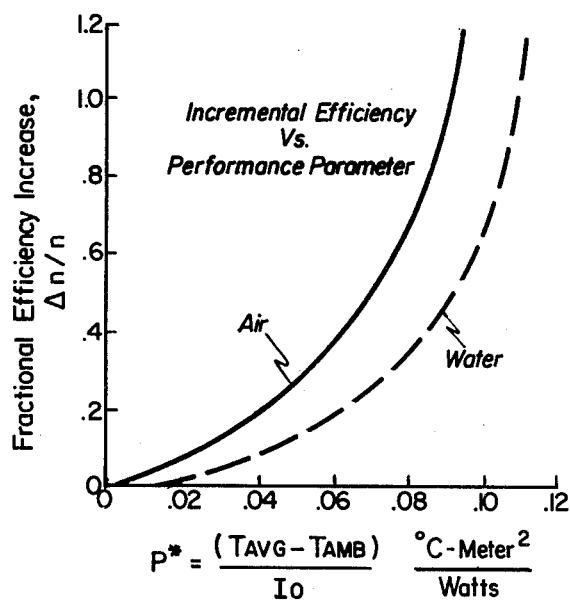
FIG. 25 is a graph showing the relationship between the normalized increase in efficiency due to addition of a transparent honeycomb radiation trap and operating conditions in both water and air heaters.

In order to better show the magnitude of the difference in efficiency improvement resulting from the inclusion of the honeycomb radiation trap in the two solar heaters, a graph showing the fractional efficiency increase over the efficiency of the solar heaters without the honeycomb is presented in FIG. 25. It will be noted that over the entire range of operating conditions the thermal efficiency increase for the transpiration air heater is signifcantly greater than that for the flat plate water heater.

Figure 26:
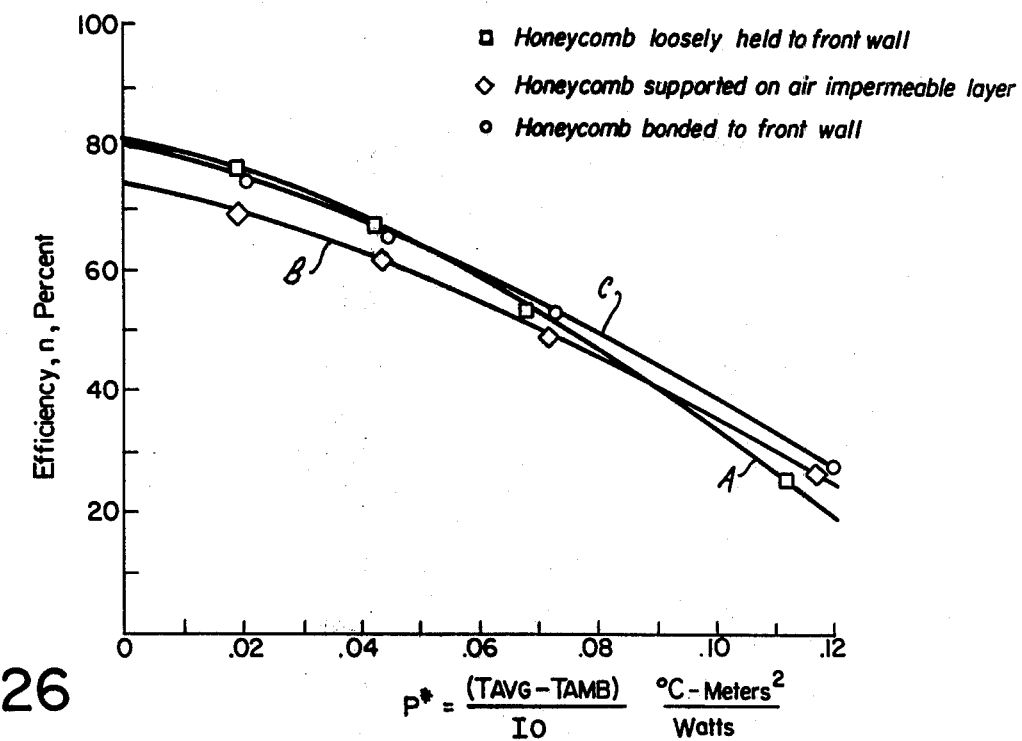
FIG. 26 is a graph similar to FIG. 24 showing the relationship between the thermal efficiencies and operating conditions for air heaters with an additional light-transmitting layer beneath the honeycomb and without the additional layer but with the honeycomb either bonded to the transparent wall or supported between the transparent wall and porous absorber.

Another series of experiments was conducted to demonstrate the importance of maintaining the transparent radiation trap in at least firm mechanical contact with the front wall 12 in those embodiments where the radiation trap is positioned adjacent to the front wall and the trap serves the additional function of providing an air buffer layer. As mentioned above, the transparent radiation trap is preferably bonded directly to the underneath side of the front wall 12 or, alternatively, may be held in firm mechanical contact by an open support structure which minimizes reflection losses of solar radiation back toward the front wall. The experiments were conducted with a single collector of a construction similar to that shown in FIG. 10 wherein the porous collector plate or absorber had a V-shaped configuration and was tested using the same tubular honeycomb radiation trap positioned adjacent to the underneath side of the front wall. The honeycomb radiation trap was made from polycarbonate tubes with an aspect ratio of 7 and a wall thickness of 0.009 centimeters. The radiation trap was held in place by different means in each test. In the first test the radiation trap was held loosely against the front wall by an open support structure consisting of thin spaced apart parallel bars. In the second test the radiation trap was held against the front wall by a continuous sheet of light-transmitting air impermeable material, i.e. a fiber glass reinforced polyester sheet with a high solar transmittance of between 0.85 and 0.90. In the third test, the radiation trap was bonded to the front wall with a silicone rubber adhesive sealant. The bond was such that air could not pass through the honeycomb into contact with the front wall. In all other respects, the solar heaters remained the same throughout the experiments. The performance tests were conducted in accordance with the National Bureau of Standards procedure outlined hereinabove. The results of these tests are shown in the graph of FIG. 26. Curve A represents the results of the test wherein the honeycomb radiation trap was held loosely against the front wall by an open support structure while curve B represents the results wherein the radiation trap was held in place by the continuous sheet of air impermable light-transmitting material. Curve C represents the results of the test wherein the honeycomb trap was actually bonded to the front wall with the adhesive sealant in accordance with the present invention. It will be observed from the curve that at a low value of P* corresponding to low temperature operation of the solar heaters, the solar heater using the additional air impermeable layer (curve B) exhibits a lower efficiency than either of the others due to additional reflection losses of some of the incident solar rays. It will be further observed that the solar heater in which the honeycomb is only loosely held against the front wall (curve A) exhibits a faster degradation of performance with increasing temperature (corresponding to high values of P*) than the other heaters. This effect is due to increased heat losses resulting from the passage of some air through the honeycomb and in contact with the front wall. However, neither of these effects are observed in the case where the honeycomb trap is actually bonded to the front wall (curve C) using an adhesive sealant. As a result, high efficiencies are attained over the entire range of operating conditions.

Figure 27A:
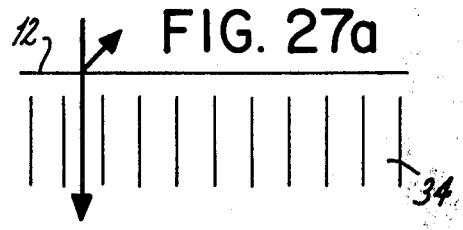
FIGS. 27a–b, 28a–b are schematic views of the patterns of reflection losses and air flows in different experimental solar air heaters with radiation traps.
Figure 27B:
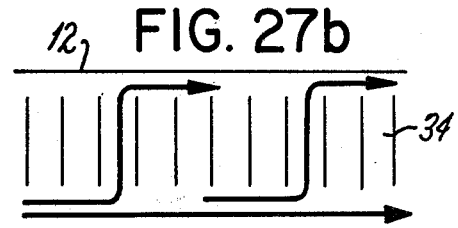
Figure 28A:
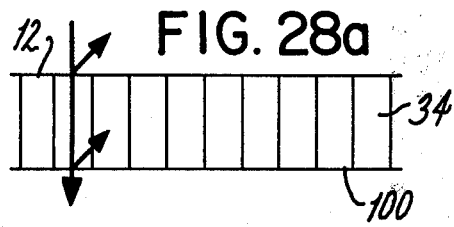
Figure 28B:
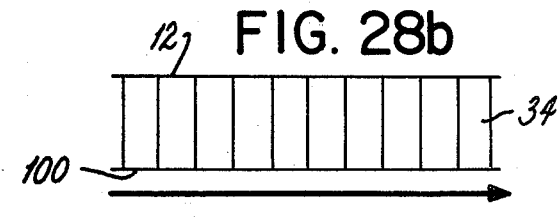
Figure 29A:
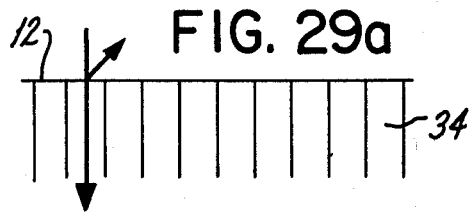
Figure 29B:
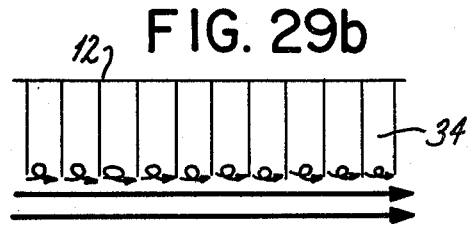

The differences in performance noted above can be better understood by reference to the schematic views "a" and "b" in FIGS. 27, 28 and 29. In particular, FIG. 27 shows the pattern of reflection losses in view "a" and the pattern of air flow in view "b" for the solar heater wherein the honeycomb trap 34 is loosely held against the front wall 12 by an open support structure. As denoted by the arrows in view "a", reflection losses in a direction away from the collector occur only at the front wall. As further depicted by the arrows in view "b", a portion of the air flow through the solar heater passes through the honeycomb trap 34 and comes into contact with the front wall 12 where heat losses may occur. The performance of this solar heater is represented by curve A in FIG. 26.

FIG. 28 shows the pattern of reflection losses in view "a" and the pattern of air flow in view "b" for the solar heater wherein the honeycomb trap 34 is supported by an air impermeable light-transmitting layer 100. Again as depicted by the arrows in view "a" reflection losses occur at the front wall 12 and in addition they also occur at the air impermeable layer 100. Also, as depicted by the arrows in view "b", all of the air flow is prevented from passing into the honeycomb trap by the presence of the air impermeable layer 100 and thus the honeycomb acts in addition as an air buffer. The performance of this solar heater is represented by curve B in FIG. 26. As shown by curve B, at low temperature the increased reflection losses in the solar heater result in a lower efficiency than that of the solar heater represented by curve A while at higher temperatures the presence of an air buffer layer results in a higher efficiency than that of the solar heater represented by curve A.

FIG. 29 shows the pattern of reflection losses in view "a" and the pattern of air flow in view "b" for the solar heater wherein the honeycomb trap 34 is bonded to the front wall 12 by an adhesive sealant. The pattern of reflection losses is basically the same as that shown in view "a" of FIG. 27 but differs from the pattern of reflection losses shown in view "a" of FIG. 28 in that no additional reflection losses occur below the front wall. Conversely, as shown in view "b", the pattern of air flow is basically the same as that for the solar heater shown in view "b" of FIG. 28 in that there is no air flow through the honeycomb to the front wall. Thus the bonded honeycomb trap acts as an air buffer by providing a stagnant layer of air in all but the lowermost portion of the honeycomb as shown by the arrows in the drawing.

Although the radiation trap has been depicted in the accompanying drawing as having walls which are disposed perpendicular to the front wall, it will be understood of course that the present invention is not so restricted and that the radiation trap may in fact be made with walls that are disposed at other angles with respect to the front wall so long as any solar rays reflected from the cell walls are not directed back toward the front wall during normal periods of operations. For most practical purposes, the normal period of operation may be considered to include a period of about three hours before and after solar noon. Within this period, solar rays will be incident on the solar heater at an angle within about 45 degrees of the perpendicular to the front wall. For any given range of angles of incidence, the cell walls must be disposed at an angle less than some critical angle measured with respect to the perpendicular to the front wall in order to insure that any reflected solar ray are not directed back toward the front wall.

Figure 30A:
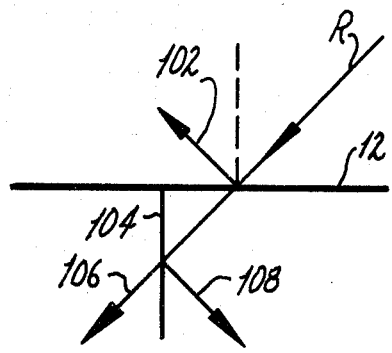
FIGS. 30a–d are schematic views of the patterns of transmitted and reflected rays from radiation trap cell walls which are at several different orientations with respect to the front wall.
Figure 30B:
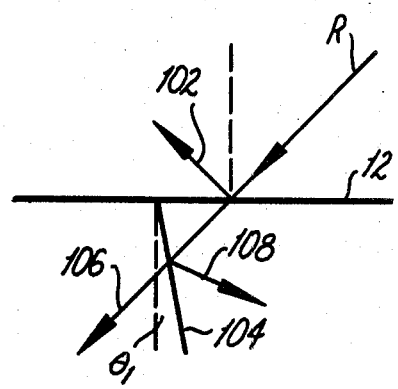
Figure 30C:
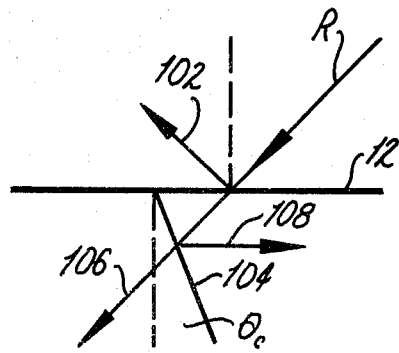
Figure 30D:
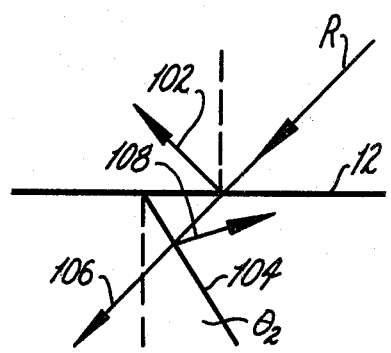

The development of the critical angle for the range of incidence angles up to 45 degrees from the perpendicular to the front wall is schematically depicted in the views of FIGS. 30a to 30d. As shown in all the views "a" to "d" of FIG. 30, the solar rays incident within an angle of 45 degrees from the perpendicular to the front wall are partly reflected from the front wall 12 as depicted by the arrow 102 and partly transmitted directly through the front wall where the solar rays strike the cell wall 104 and are again partly transmitted and partly reflected as denoted by the arrows 106 and 108 respectively. As shown schematically in FIG. 30a when the cell wall 104 is aligned with the perpendicular to the front wall, the reflected ray 108 will be directed away from the front wall 12 and toward the absorber. FIG. 30b shows the pattern of transmitted and reflected rays in the instance where the cell wall 104 is disposed at an angle $\theta_1$ which is less than the critical angle $\theta_c$. It will be noted that the reflected ray 108 is still in a direction away from the front wall and toward the absorber. FIG. 30c shows the pattern of transmitted and reflected rays in the instance where the cell wall 104 is disposed at the critical angle $\theta_c$ and the reflected ray 108 is directed parallel to the front wall 12. For the incident angle of 45 degrees shown in the drawing, the critical angle $\theta_c$ is 22.5 degrees with respect to the perpendicular to the front wall. When the cell walls are disposed at angles of $\theta_2$ greater than $\theta_c$, the reflected rays 108 as shown in FIG. 30d will be directed back toward the front wall and away from the absorber. Thus the phrase "substantially perpendicular to the front wall" as used herein and in the appended claims to define the orientation of the cell walls is intended to mean that the cell walls may be disposed at any angle less than the critical angle measured with respect to the perpendicular to the front wall, e.g. at angles of less than about 22.5 degrees when the normal period of operation is taken from about three hours before and after solar noon.

Figure 31:
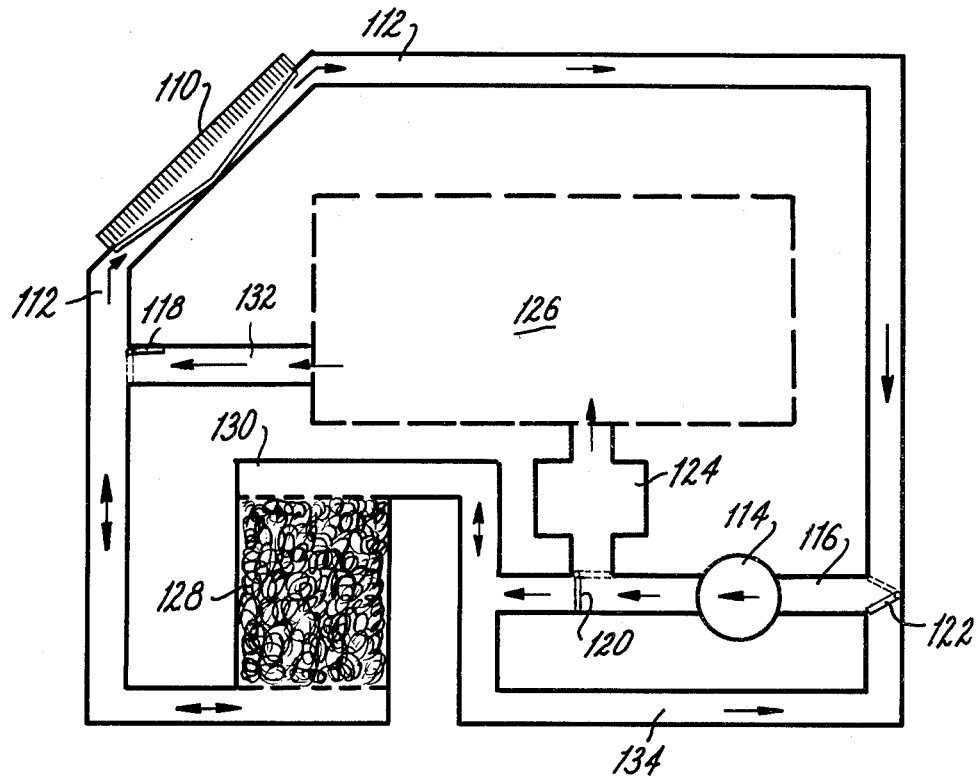
FIG. 31 is a schematic view of a typical solar heating system employing a solar air heater embodying the present invention.

A typical solar space heating system incorporating a transpiration air heater in accordance with the present invention is shown schematically in FIG. 31. As shown, air is drawn first through the solar air heater 110 via duct 112 by means of a mechanical blower 114 in duct 116 and is heated by absorbed radiation when sufficient sunlight is available. With the dampers 118, 120 and 122 in the positions as shown in the drawing, the heated air is forced through the furnace 124 and then passes into the space to be heated indicated at 126. The furnace 124 may be any conventional gas, oil or electric furnace or other heating source. When the temperature of the air leaving the solar heater in the duct 112 is below the temperature required for heating the space 126, additional heat may be added by the furnace 124. During periods when no heating of the space 126 is required, the positions of dampers 118 and 120 may be changed to those shown in the dotted lines in order to allow the solar heated air to pass through a rock bed thermal storage bin 128 via duct 130. Heat stored in the storage bin 128 may be utilized to heat the space 126 during periods when sufficient sunlight is not available to provide adequately heated air directly from the solar air heater 110. To utilize the stored heat, the dampers 118, 120 are moved to the position indicated by the solid lines and damper 122 is moved to the position indicated by the dotted lines such that air to be heated is drawn from the space 126 via duct 132, then through the thermal storage bin 128 wherein the air is heated. The heated air then passes through the blower 114 via the ducts 130, 134. Heated air passes through the furnace 124 where additional heat may be added to the air if the temperature of the heated air is not sufficient to maintain the space 126 at the desired temperature.

What is claimed is:

1. A solar air heater comprising, in combination:
   a housing having a light-transmitting front wall for passing incident solar radiation and including an inlet and an outlet for establishing a flow path for a gaseous medium to be heated;
   a gas-permeable radiation absorbent collector element positioned across the flow path in said housing and arranged to accept incident solar radiation passing through said front wall and to transfer the absorbed heat to said gaseous medium passing along said flow path and through said collector element; and
   a radiation trap disposed in said housing adjacent to the surface of said front wall facing said collector element, said radiation trap comprising a cellular structure containing a multiplicity of open cells in communication with said flow path and having cell walls which are substantially perpendicular to said front wall and which serve as baffle elements to inhibit the flow of said gaseous medium through said radiation trap in a direction substantially parallel to the plane of said front wall, said cellular structure being maintained in at least firm mechanical contact with said front wall and being composed of a light-transmitting material which is opaque to infrared radiation emitted from said collector element in a direction toward said front wall.

2. A solar air heater according to claim 1 wherein said cellular structure is made from a clear plastic composition selected from the group consisting of polyvinyl fluoride, polycarbonate, fluorinated ethylene propylene, polymethyl methacrylate, aromatic polysulfones, polyethylene terephthalate, aromatic polyesters, polyvinylidene fluoride, hexafluoropropylene, chlorortrifuloroethylene and tetrafluoroethylene copolymers.

3. A solar air heater according to claim 1 wherein said cellular structure comprises a transparent honeycomb.

4. A solar air heater according to claim 3 wherein said transparent honeycomb is composed of a multiplcity of cells having a hexagonal cross-section.

5. A solar air heater according to claim 3 wherein said transparent honeycomb is composed of a multiplicity of cells having a rectangular cross-section.

6. A solar air heater according to claim 3 wherein said transparent honeycomb is composed of a multiplicity of cells formed by tubes stacked side-by-side and bonded to adjacent tubes by an adhesive or solvent.

7. A solar air heater according to claim 3 wherein said transparent honeycomb is composed of a multiplicity of cells having a length to diameter ratio of between about 2 and 10.

8. A solar air heater according to claim 3 wherein said transparent honeycomb is composed of a multiplicity of cells having walls of a thickness within the range of from about 0.0002 to about 0.05 centimeters.

9. A solar air heater according to claim 1 wherein said cellular structure is formed by an array of transparent spaced apart, parallel fins disposed in a direction substantially perpendicular to said flow path.

10. A solar air heater according to claim 9 wherein said transparent spaced apart, parallel fins have a height to spacing ratio of between about 4 and 20.

11. A solar air heater according to claim 9 wherein said transparent spaced apart, parallel fins have a wall thickness within the range of from about 0.0002 to about 0.05 centimeters.

12. A solar air heater according to claim 1 wherein said cellular structure is held in firm contact against said front wall by open support means.

13. A solar air heater according to claim 12 wherein said support means comprises an open mesh placed against the side of said cellular structure opposite to said front wall.

14. A solar air heater according to claim 12 wherein said support means comprises a plurality of spaced apart, parallel bars placed against the side of said cellular structure opposite to said front wall.

15. A solar air heater according to claim 1 wherein said cellular structure is bonded to said front wall.

16. A solar air heater according to claim 1 wherein said radiation absorbent collector element comprises a porous opaque mat made from a material selected from the group consisting of pressed fibers, woven screen, stamped screen and reticulated foam.

17. A solar air heater according to claim 1 wherein said radiation absorbent collector element is positioned in substantially parallel, spaced apart relation to said front wall.

18. A solar air heater according to claim 17 wherein said inlet and outlet are arranged in said housing such that said gaseous medium to be heated passes through said radiation absorbent collector element in a direction away from said front wall.

19. A solar air heater according to claim 17 wherein said inlet and outlet are arranged in said housing such that said gaseous medium to be heated passes through said radiation absorbent collector element in a direction toward said front wall.

20. A solar air heater according to claim 17 wherein baffle means are provided for directing said gaseous medium to be heated first through one segment of said radiation absorbent collector element and then through another segment thereof.

21. A solar air heater according to claim 1 wherein said radiation absorbent collector element is positioned in non-parallel relation to said front wall.

22. A solar air heater according to claim 21 wherein said inlet and outlet are arranged in said housing such that said gaseous medium to be heated passes through at least one radiation absorbent collector element without changing direction.

23. A solar air heater according to claim 22 wherein said inlet and outlet are arranged in said housing such that said gaseous medium to be heated passes through said radiation absorbent collector element in a direction toward the surface facing said front wall.

24. A solar air heater according to claim 22 wherein said inlet and outlet are arranged in said housing such that said gaseous medium to be heated passes through said radiation absorbent collector element in a direction away from the surface facing said front wall.

25. A solar air heater according to claim 22 wherein said radiation absorbent collector element comprises two non-parallel segements arranged in a V-shaped configuration.

26. A solar air heater according to claim 25 wherein said inlet and outlet are arranged in said housing such that said gaseous medium to be heated passes first through one of said non-parallel segments and then through the other of said non-parallel segments forming said V-shaped collector element.

27. A solar air heater according to claim 1 wherein said housing includes a bottom wall and side walls and wherein said inlet and outlet are located in opposite side walls of said housing.

28. A solar air heater according to claim 27 wherein a layer of insulation is provided adjacent to said bottom wall.

29. A solar air heater according to claim 27 wherein said housing is made of metal.

30. A solar air heater according to claim 27 wherein said housing is made of a rigid insulating material.

31. In a solar heating system including a solar air heater, means for passing a gas to be heated through said solar air heater and for directing the heated gas to a space to be heated, a storage device for storing heat over a prolonged period of time, means for periodically diverting said heated gas away from said space and into said storage device when said space has reached a predetermined temperature and means for periodically directing the gas to be heated through said storage device for heating said gas and then directing said heated gas into said space; the improvement wherein said solar air heater comprises, in combination:
  a housing having a light-transmitting front wall for passing incident solar radiation and including an inlet and an outlet for establishing a flow path for a gaseous medium to be heated;
  a gas-permeable radiation absorbent collector element positioned accross the flow path in said housing and arranged to accept incident solar radiation passing through said front wall and to transfer the absorbed heat to said gaseous medium passing along said flow path and through said collector element; and
  a radiation trap disposed in said housing adjacent to the surface of said front wall facing said collector element, said radiation trap comprising a cellular structure containing a multiplicity of open cells in communication with said flow path and having cell walls which are substantially perpendicular to said front wall and which serve as baffle elements to inhibit the flow of said gaseous medium through said radiation trap in a direction substantially parallel to the plane of said front wall, said cellular structure being maintained in at least firm mechanical contact with said front wall and being composed of a light-transmitting material which is opaque to infrared radiation emitted from said collector element in a direction toward said front wall.

32. A solar heating system according to claim 31 wherein said means for directing said heated gas to the space to be heated includes an additional heating source.

33. A solar heating system according to claim 31 wherein said storage device comprises a rock bin.

34. A solar air heater according to claim 1 wherein said cellular structure is made from glass.

* * * * *

UNITED STATES PATENT AND TRADEMARK OFFICE
CERTIFICATE OF CORRECTION

PATENT NO. : 4,262,657
DATED : April 21, 1981
INVENTOR(S) : Robert W. McCullough and Thomas A. Hewett It is certified that error appears in the above—identified patent and that said Letters Patent is hereby corrected as shown below:

Col. 5, line 27, after "28a-b", insert --and 29a-b--.

Col. 13, line 49, "curve" should read --curves--.

Signed and Sealed this

Twenty-seventh Day of October 1981

[SEAL]

Attest:

Attesting Officer

GERALD J. MOSSINGHOFF

Commissioner of Patents and Trademarks